US012809796B2

(12) United States Patent
Ling et al.

(10) Patent No.: US 12,809,796 B2
(45) Date of Patent: Nov. 24, 2026

(54) METHODS, DEVICES AND COMPUTER PROGRAM PRODUCTS FOR PROCESSING INPUT/OUTPUT REQUESTS

(71) Applicant: Dell Products L.P., Round Rock, TX (US)

(72) Inventors: Qinghua Ling, Beijing (CN); Zheng He, Shanghai (CN); Yue Qian, Shanghai (CN); Xuyao Pan, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/966,477

(22) Filed: Dec. 3, 2024

(65) Prior Publication Data

US 2025/0348450 A1 Nov. 13, 2025

(30) Foreign Application Priority Data

May 10, 2024 (CN) ......................... 202410578750.0

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC ................................................... G06F 13/4221
See application file for complete search history.

(56) References Cited

U.S. PATENT DOCUMENTS

| | | | | |
|---|---|---|---|---|
| 8,108,590 | B2 * | 1/2012 | Chow | G06F 21/78 711/E12.098 |
| 9,727,256 | B1 | 8/2017 | Mayatskikh et al. | |
| 11,163,602 | B2 * | 11/2021 | Shveidel | G06F 9/485 |
| 2008/0065644 | A1 | 3/2008 | Pasupuleti et al. | |
| 2008/0301256 | A1 * | 12/2008 | McWilliams | G06F 12/0806 714/E11.178 |
| 2016/0055084 | A1 | 2/2016 | Rangaswami et al. | |
| 2022/0214812 | A1 | 7/2022 | Alkalay et al. | |
| 2022/0300349 | A1 | 9/2022 | Shveidel et al. | |
| 2023/0229332 | A1 | 7/2023 | Shveidel et al. | |

* cited by examiner

*Primary Examiner* — Henry Tsai
*Assistant Examiner* — Juanito C Borromeo
(74) *Attorney, Agent, or Firm* — BainwoodHuang

(57) ABSTRACT

Techniques for processing an input/output (IO) request involve transmitting a first IO request from a source terminal to a target terminal. Such techniques further involve determining whether a second IO request shares the same page of the target terminal with the first IO request based on a first page size of the source terminal and a second page size of the target terminal, the second IO request being after the first IO request. Such techniques further involve placing, in response to the second IO request sharing the same page of the target terminal with the first IO request, the second IO request in a queue for queuing up to wait for transmission. In this way, sequential IO requests are reordered, thereby avoiding IO performance degradation during cross-storage array platform replication, and improving the data transmission speed.

20 Claims, 7 Drawing Sheets

METHODS, DEVICES AND COMPUTER PROGRAM PRODUCTS FOR PROCESSING INPUT/OUTPUT REQUESTS

CROSS-REFERENCE TO RELATED APPLICATION

This application claims priority to Chinese Patent Application No. CN202410578750.0, on file at the China National Intellectual Property Administration (CNIPA), having a filing date of May 10, 2024, and having "METHODS, DEVICES AND COMPUTER PROGRAM PRODUCTS FOR PROCESSING INPUT/OUTPUT REQUESTS" as a title, the contents and teachings of which are herein incorporated by reference in their entirety.

TECHNICAL FIELD

The present invention relates to the field of data storage, and more specifically relates to a method, device, and computer program product for processing an input/output (IO) request.

BACKGROUND

As is known to all, a page size is an internal parameter of a storage array. Not only does a page size difference exist between storage arrays of different types, but also a page size difference exists between versions of the same storage array through technology updates. Therefore, the same IO mode may have different performance on storage array platforms with different parameters.

With the development of storage array software, a page size of a storage array may be changed during implementation to improve the storage efficiency or for other purposes. Typically, this can improve the host IO performance in some modes, but may not always be conducive to IO replication.

SUMMARY OF THE INVENTION

Embodiments of the present invention provide a method, device, and computer program product for processing an IO request.

According to a first aspect of the embodiments of the present invention, a method for processing an IO request is provided, the method including: transmitting a first IO request from a source terminal to a target terminal; determining whether a second IO request shares the same page of the target terminal with the first IO request based on a first page size of the source terminal and a second page size of the target terminal, the second IO request being after the first IO request; and placing, in response to the second IO request sharing the same page of the target terminal with the first IO request, the second IO request in a queue for queuing up to wait for transmission.

According to a second aspect of the embodiments of the present invention, an electronic device is provided, including:

at least one processor; and coupled to the at least one processor and having instructions stored thereon, where the instructions, when executed by the at least one processor, cause the electronic device to execute actions including: transmitting a first IO request from a source terminal to a target terminal; determining whether a second IO request shares the same page of the target terminal with the first IO request based on a first page size of the source terminal and a second page size of the target terminal, the second IO request being after the first IO request; and placing, in response to the second IO request sharing the same page of the target terminal with the first IO request, the second IO request in a queue for queuing up to wait for transmission.

According to a third aspect of the embodiments of the present invention, a computer program product is provided. The computer program product is tangibly stored on a non-volatile computer-readable medium and includes machine-executable instructions. The machine-executable instructions, when executed, cause a machine to execute actions including: transmitting a first IO request from a source terminal to a target terminal; determining whether a second IO request shares the same page of the target terminal with the first IO request based on a first page size of the source terminal and a second page size of the target terminal, the second IO request being after the first IO request; and placing, in response to the second IO request sharing the same page of the target terminal with the first IO request, the second IO request in a queue for queuing up to wait for transmission.

It should be understood that the content described in the Summary of the Invention section is neither intended to identify key or important features of the embodiments of the present disclosure, nor intended to limit the scope of the present disclosure. Other features of the present disclosure will become readily understood with reference to the following description.

DESCRIPTION OF DRAWINGS

In conjunction with the drawings and with reference to detailed description below, the above and other features, advantages, and aspects of embodiments of the present disclosure will become more apparent. Identical or similar reference numerals in the drawings always represent identical or similar elements. In the figures.

DETAILED DESCRIPTION

Figure 1:
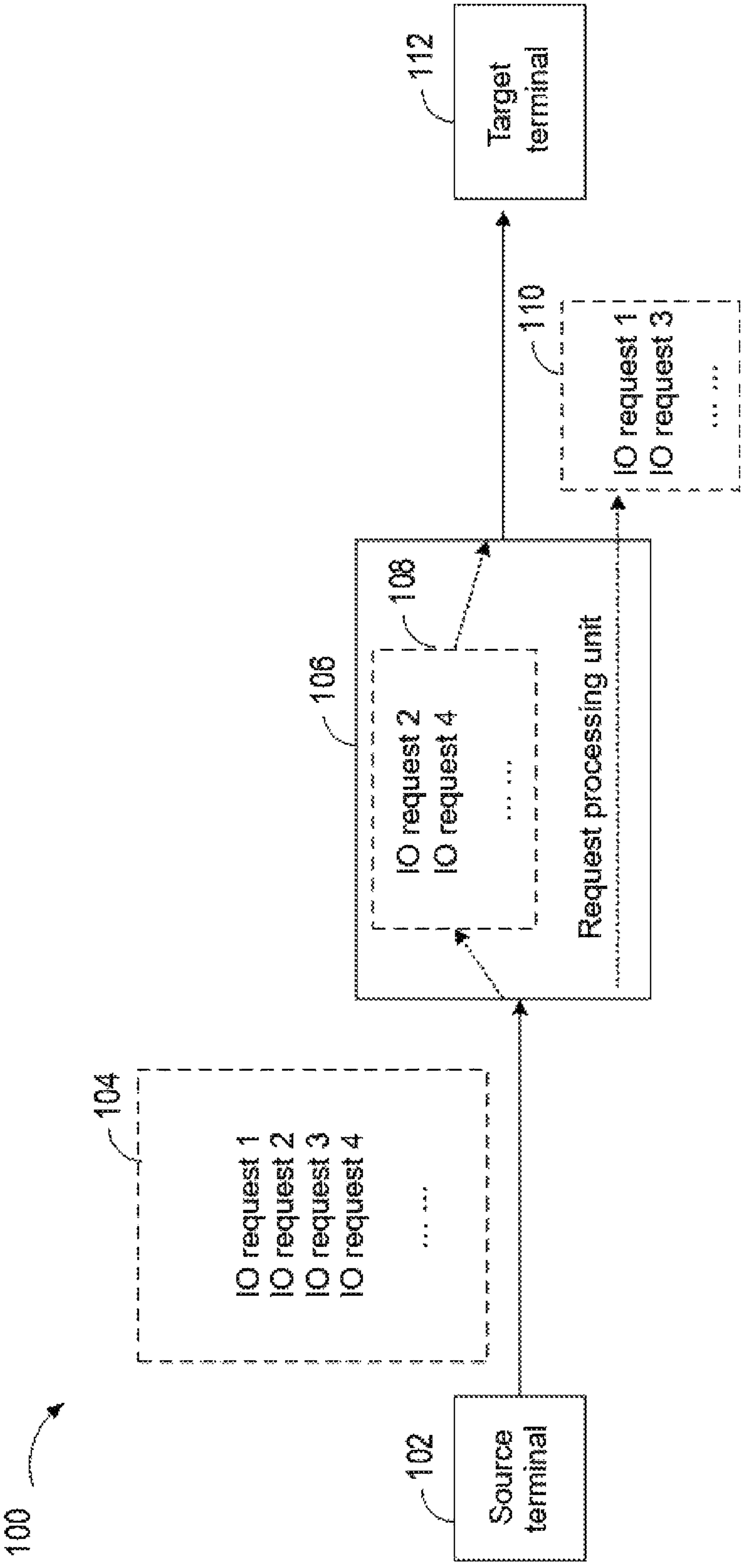
FIG. 1 shows a schematic diagram of an environment for implementing an example solution of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more detail below with reference to the drawings. While some embodiments of the present disclosure are shown in the drawings, it should be understood that the present disclosure may be implemented in various forms, and should not be construed as being limited to the embodiments set forth herein. On the contrary, these embodiments are provided to more thoroughly and completely understand the present disclosure. It should be understood that the drawings and embodiments of the present disclosure are only used as examples, and are not intended to limit the scope of protection of the present disclosure.

In the description of the embodiments of the present disclosure, the terms “including,” “having,” and similar wordings thereof should be construed as open-ended inclusions, i.e., “including but not limited to.” The term “based on” should be construed as “at least partially based on.” The term “embodiment,” “an embodiment,” or “the embodiment” should be construed as “at least one embodiment.”

An IO mode may have different performance on storage array platforms with different page sizes, where a page is the smallest storage unit, and its size is generally an integer multiple of the smallest unit of read and write data of a file system. For example, IO that is aligned with the page size on a storage array may become misaligned with the page size on another storage array with a different page size. For example, when the page size is set to 8 KB, each IO will have a granularity of 8 KB in terms of data write/read, locking, and snapshot difference; and if an IO of partial data (misaligned 8 KB) is written on a page, it is further necessary to lock the whole page of 8 KB. If two ongoing IOs share the same page of 8 KB, lock contention will occur between them, leading to an increased IO latency.

While increase of the page size of the storage array helps to improve the storage efficiency, improves the host IO performance, and the like, IO performance degradation may occur when replication of a data volume between storage arrays with different page sizes is performed. For example, when a data volume is replicated from a source storage array platform to a target storage array platform, if the target storage array has a page size larger than that of the source storage array, for example, the source storage array having a page size of 4 KB and the target storage array having a page size of 8 KB, the replicated IOs that are aligned in the source storage array will be misaligned in the target storage array, that is, two IOs share a page of 8 KB, resulting in lock contention between the two IOs, thereby leading to IO latency.

To this end, the present disclosure provides a solution, which determines whether a current IO request shares the same page with the last transmitted IO request based on a page size of a source terminal and a page size of a target terminal, and then determines whether the current IO request needs to be queued, thereby avoiding the problem of IO performance degradation during cross-storage array platform replication, and improving the data transmission speed.

FIG. 1 shows a schematic diagram of an environment 100 for implementing an example solution of the present disclosure. The environment 100 includes a source terminal 102, an IO request processing unit 106, a target terminal 112, and IO requests, where the IO requests include sequential IO requests 104, an IO request waiting queue 108, and a first transmitted IO request 110. In some embodiments, the source terminal 102 may be a storage array system, a host, etc., the target terminal 112 may be a storage array system, etc., and the IO request processing unit 106 may be a mechanism that provides a layered service, a replicator, etc.

As shown in FIG. 1, the source terminal 102 transmits the sequential IO requests 104 to the IO request processing unit 106. IO requests in the sequential IO requests 104 are arranged sequentially. Since adjacent IO requests may share the same page of the target terminal, they need to go through the IO request processing unit 106 prior to being transmitted to the target terminal 112. Through the IO request processing unit 106, whether to reorder the sequential IO requests 104 may be decided, and when it is determined that the sequential IO requests 104 need to be reordered, an operation of transmitting the IO requests in the sequential IO requests 104 to the target terminal 112 in a new order is performed.

In some embodiments, if a page size of the source terminal 102 is smaller than a page size of the target terminal, the IO request processing unit 106 determines that the sequential IO requests 104 need to be reordered. After an IO request 1 in the sequential IO requests 104 is transmitted, the IO request processing unit 106 determines whether an IO request 2 will share the same page with the IO request 1. If yes, the IO request 2 is placed in the IO request waiting queue 108 to wait for transmission, and if no, the IO request 2 is directly transmitted to the target terminal 112. Then, whether an IO request 3 will share the same page with the last transmitted IO request is determined. If no, the IO request 3 is directly transmitted to the target terminal; and if yes, the IO request 3 is placed in the IO request waiting queue 108 to wait for transmission. In this way, determination and processing of subsequent IO requests are continued, thereby forming the IO request waiting queue 108 in which IO requests are non-adjacent and the first transmitted IO request 110. Because an interval between the IO requests in the sequential IO requests 104 is small or even 0, after the first (odd-ordered) IO request is first transmitted, even-ordered IO requests will need to wait, the IO requests in the IO request waiting queue 108 are all even-ordered IO requests, and IO requests in the first transmitted IO request 110 are all odd-ordered IO requests.

Waiting IO requests in the IO request waiting queue 108 will be transmitted to the target terminal 112 by the IO request processing unit 106 when a transmitting action is triggered. A trigger mechanism includes: when there is an IO request callback, there are enough IO requests in the IO request waiting queue 108 or whether a long enough time has elapsed since the last IO request was transmitted; or a thread specially used to scan the IO request waiting queue 108 checks that there is an IO request in the IO request waiting queue 108.

In this way, by comparing the page size of the source terminal and the page size of the target terminal, the IO requests are reordered when the page size of the source terminal is smaller than the page size of the target terminal, thereby avoiding a problem that IO requests share a page, thus avoiding IO performance degradation, and improving the data transmission speed compared with data transmission without IO reordering.

Figure 2:
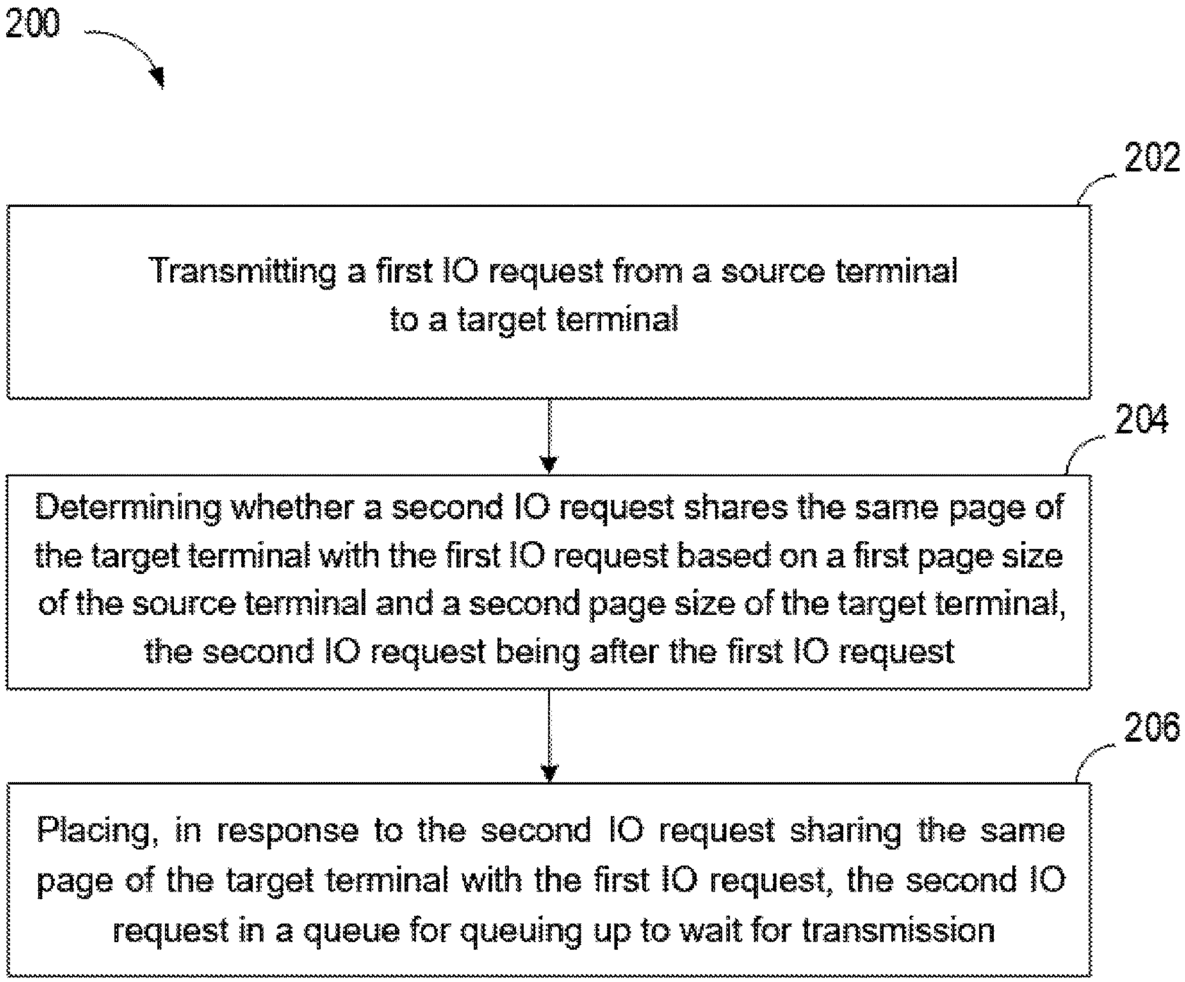
FIG. 2 shows a flow chart of a method for processing an IO request according to some embodiments of the present disclosure.

FIG. 2 shows a flow chart of a method 200 for processing an IO request according to some embodiments of the present disclosure. The method 200 may be performed in the environment 100 shown in FIG. 1. In addition, numbers in the flow chart do not mean a sequential order in which these steps are executed. Some or all of these steps can be executed in parallel, or their execution orders may be interchanged with each other, which is not limited in the present disclosure.

At block 202, a first IO request is transmitted from a source terminal to a target terminal. In some embodiments, an IO request 1 (an IO request 3, an IO request 5, . . . ) is transmitted from the source terminal 102 to the target terminal 112. The first IO request may also be the IO request 3, the IO request 5, etc. among sequential IO requests 104. They can be transmitted to the target terminal 112 as long as they do not share the same page of the target terminal 112 with each other.

At block 204, whether a second IO request shares the same page of the target terminal with the first IO request is determined based on a first page size of the source terminal and a second page size of the target terminal, the second IO request being after the first IO request. In some embodiments, whether an IO request 2 (an IO request 4, an IO request 6, . . . ) shares the same page of the target terminal with the IO request 1 (the IO request 3, the IO request 5, . . . ) is determined based on the page size of the source terminal 102 and the page size of the target terminal 112. The second IO request may also be the IO request 4, the IO request 6, etc. in the sequential IO requests 104. An IO sequence number of the second IO request needs to be one more than that of the first IO request.

In some embodiments, when the page size of the source terminal 102 is smaller than the page size of the target terminal 112, if an offset of an IO from the source terminal 102 (a distance between an actual address of a storage unit and a segment address of a segment in which the storage unit is located is referred to as the offset, and is known as an intra-segment offset or valid address) cannot be aligned with the page size of the target terminal 112 (from a storage perspective, it means that the IO from the source terminal partially occupies the page of the target terminal, and from a mathematical perspective, it means that the offset is not exactly divisible by the page size of the target terminal), for sequential IO requests 104 with an IO interval of 0, an offset of any IO request cannot be aligned with the page size of the target terminal 112, and adjacent IO requests will share the same page of the target terminal 112, thereby resulting in lock contention and then leading to latency.

For sequential IO requests with an IO interval not being 0, the last IO request may, or may not, share the same page with the current IO request. This needs to be determined based on an end offset of the last IO request, an offset of the current IO request, and the page size of the target terminal 112. If the end offset of the last IO request satisfies the following equation:

$$(\text{end offset} - 1)/(\text{page size}) = \text{current } IO \text{ offset/page size} \quad (1)$$

then the last IO request shares the same page with the current IO request. In the equation (1), the division sign represents exact division, the number 1 represents one byte, other parameters are all converted into values in bytes for computation, and the page size refers to the page size of the target terminal 112. Generally, an end offset of an IO request is not known, but can be obtained from a sum of its offset and length, where the length of the IO request is generally constant and known.

At block 206, in response to the second IO request sharing the same page of the target terminal with the first IO request, the second IO request is placed in a queue for queuing up to wait for transmission. In some embodiments, in response to the IO request 2 sharing the same page of the target terminal 112 with the IO request 1, the IO request 2 is placed in the IO request waiting queue 108 to wait for transmission. In an embodiment, a sequence number of the second IO request needs to be one more than that of the first IO request.

As can be seen from the above description, the page size is a key parameter during execution of an IO replication session, and the existing mechanism fills a predefined function value into a function list of a local system via a control path through an agent of a data path during system startup; and when a remote system is configured, functions of a peer are checked up, and their values are saved in a remote system object, so that functions of both a source system and the remote system are known prior to the replication session. In an embodiment of the present disclosure, this mechanism is extended by adding a new function that represents a page size of a storage system. If the system uses a page size of 4 KB, it has a function called PAGESIZE_IN_4 KB. If the page size is 8 KB, PAGESIZE_IN_8 KB is used.

In addition, in an embodiment of the present disclosure, new attributes are added to a data volume to facilitate operations using these attributes in the replication session. The new attributes include: an optimal transmission length whose value is initialized to a page size of a terminal (source terminal or target terminal) where the data volume is located; and an IO end offset whose value is initialized to zero.

Figure 3A:
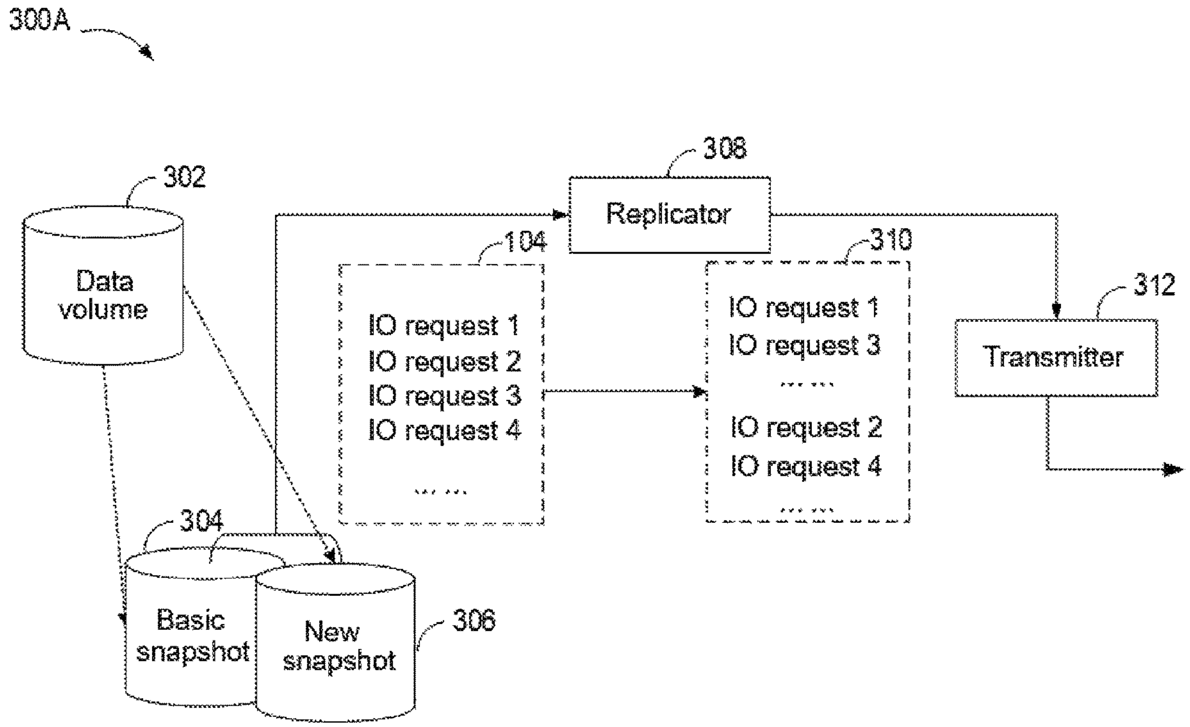
FIG. 3A shows a schematic diagram of IO request processing for asynchronous replication according to some embodiments of the present disclosure.

FIG. 3A shows a schematic diagram of a process 300A of IO request processing for asynchronous replication according to some embodiments of the present disclosure. In FIG. 3A, a replicator 308 will regularly acquire increments from two snapshots (a new snapshot 306 and a basic snapshot 304) in a scatter gather list. These snapshots are fully available copies of a data volume 302, where the copies contain all information of data in the data volume 302 at time points of copying. The time and IO required to create these snapshots do not increase with the increase of amount of data. In some storage systems, once an initial snapshot of the data volume 302 is acquired, subsequent snapshots only replicate changed data, and use a pointer system to reference the initial snapshot. This pointer-based snapshot method consumes less disk capacity than repeatedly cloning a data set.

After the increments are acquired, the replicator 308 will split the increments into sequential IO requests 104 of a constant length. The constant length is associated with characteristics of the storage system itself, which may be, for example, 64 KB. In order to avoid degradation of performance of a replicated IO, two attributes are set in the replicator, including: a reordering indication indicating whether to reorder the IO requests; and an IO end offset whose value is initialized to 0. In some embodiments, if the source terminal where the data volume 302 is located has the function of PAGESIZE_IN_4 KB, and the target terminal has the function of PAGESIZE_IN_8 KB, it can be determined that the page size of the source terminal is smaller than the page size of the target terminal. Then, after the IO request 1 is transmitted, the IO end offset is updated with a sum of an offset of the IO request 1 and the constant length, and an offset of a next IO request is compared with the updated IO end offset to determine whether the next IO request shares the same page with the last transmitted IO request.

If the offset of the next IO request and the updated IO end offset satisfy equation (1), it can be determined that the next IO request will share the same page with the last transmitted IO request, so that the next IO request is placed in a waiting queue to wait for transmission. Otherwise, the next IO request is transmitted to a transmitter 312 and is transmitted from the transmitter 312 to the target terminal. The IO end offset is updated with a sum of the offset of the next IO request and the constant length to compare with the offset of the next IO request. By such execution, the sequential IO requests 104 are actually reordered by the replicator 308 into non-sequential IO requests 310 with odd-ordered IO requests at the front and even-ordered IO requests at the rear.

In order to enable IO requests in the queue to be transmitted, it is necessary to set an operation of triggering dequeue for them. Once a triggering condition is satisfied, one of the IO requests in the queue can be transmitted. The triggering can be implemented by two mechanisms. One is to use a callback function. When there is an IO request callback, if there are enough IO requests in the IO request waiting queue 108 or a long enough time has elapsed since the last IO request was transmitted, transmission of the IO request in the waiting queue 108 is triggered. The other is to create a new thread, which is specially used to scan the IO request waiting queue 108. When it checks that there is an IO request in the IO request waiting queue 108, transmission of the IO request in the waiting queue 108 will be triggered.

In the mechanism of creating a new thread, the new thread is used to regularly scan all queues in the replicator 308. If there is an IO request in any queue, a queue is dequeued and transmitted to the transmitter 312 in every replication period (a few milliseconds, depending on replication network overhead) to ensure that all of the requests are eventually transmitted. Otherwise, the last replicator IO request is dequeued.

If any IO request fails, the replicator 308 will clear IO requests in the queue, and stop at the failed IO request.

Figure 3B:
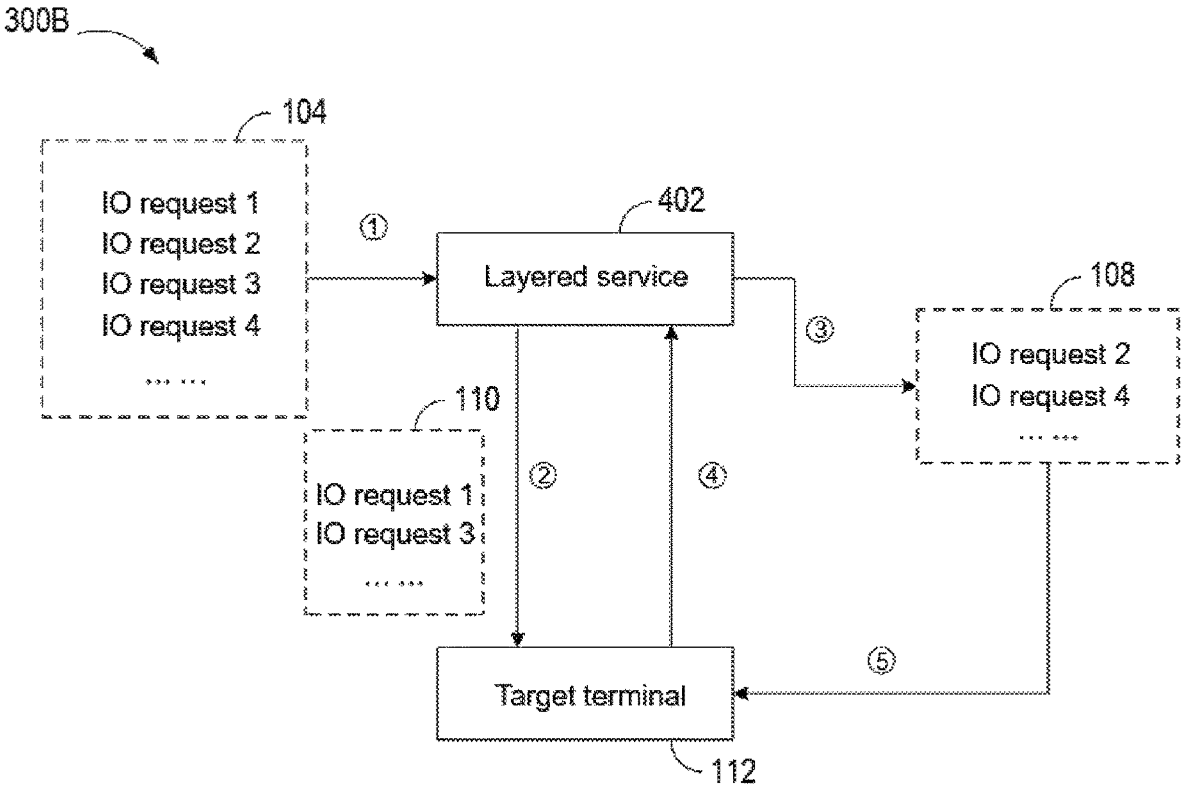
FIG. 3B shows another schematic diagram of IO request processing for asynchronous replication according to some embodiments of the present disclosure.

A complete process in which all of the sequential IO requests 108 are transmitted to the target terminal is described below with reference to FIG. 3B. FIG. 3B shows a schematic diagram of a process 300B of IO request processing for asynchronous replication according to some embodiments of the present disclosure. As shown in FIG. 3B, the process 300B can be divided into five processes, including a sequential IO transmission process ①, an IO request first transmission process ②, an IO request queuing process ③, an IO request callback process ④, and an IO request dequeuing process ⑤.

In the sequential IO transmission process ①, the sequential IO requests 104 are transmitted to a layered service 402. The layered service 402 can reorder sequential IO requests 104 misaligned with a page size of the target terminal 112. For a first transmitted IO request 110 with an IO offset failing to satisfy equation (1), the IO request first transmission process ② is executed, and the request is directly transmitted to the target terminal 112. For an IO request with an IO offset satisfying equation (1), the IO request queuing process ③ is executed, and the request is placed in the IO request waiting queue 108 to wait for transmission.

After the target terminal 112 completes an IO request replication session, a data path executes the IO request callback process ④. During the process ③, whether there are enough IO requests in the IO request waiting queue 108 or whether enough time has elapsed since the last IO request was transmitted is checked, for example, there are at least 4 IO requests or 1 ms has elapsed, to reduce conflicts again. If yes, the IO request dequeuing process ⑤ is executed, and the IO request in the IO request waiting queue 108 is dequeued and transmitted to the transmitter 312.

In this way, after the IO requests are reordered, most of the IO requests will no longer share the same page. In some embodiments, the dequeued IO request in the IO request dequeuing process ⑤ is determined to be an IO request that shares the same page with a recalled IO request. In some embodiments, the dequeued IO request is a random IO request. In an embodiment of the present disclosure, dequeuing a random IO request in the queue is tested, and the result is not greatly different from the result that the dequeued IO request is the IO request that shares the same page with the recalled IO request.

Figure 4:
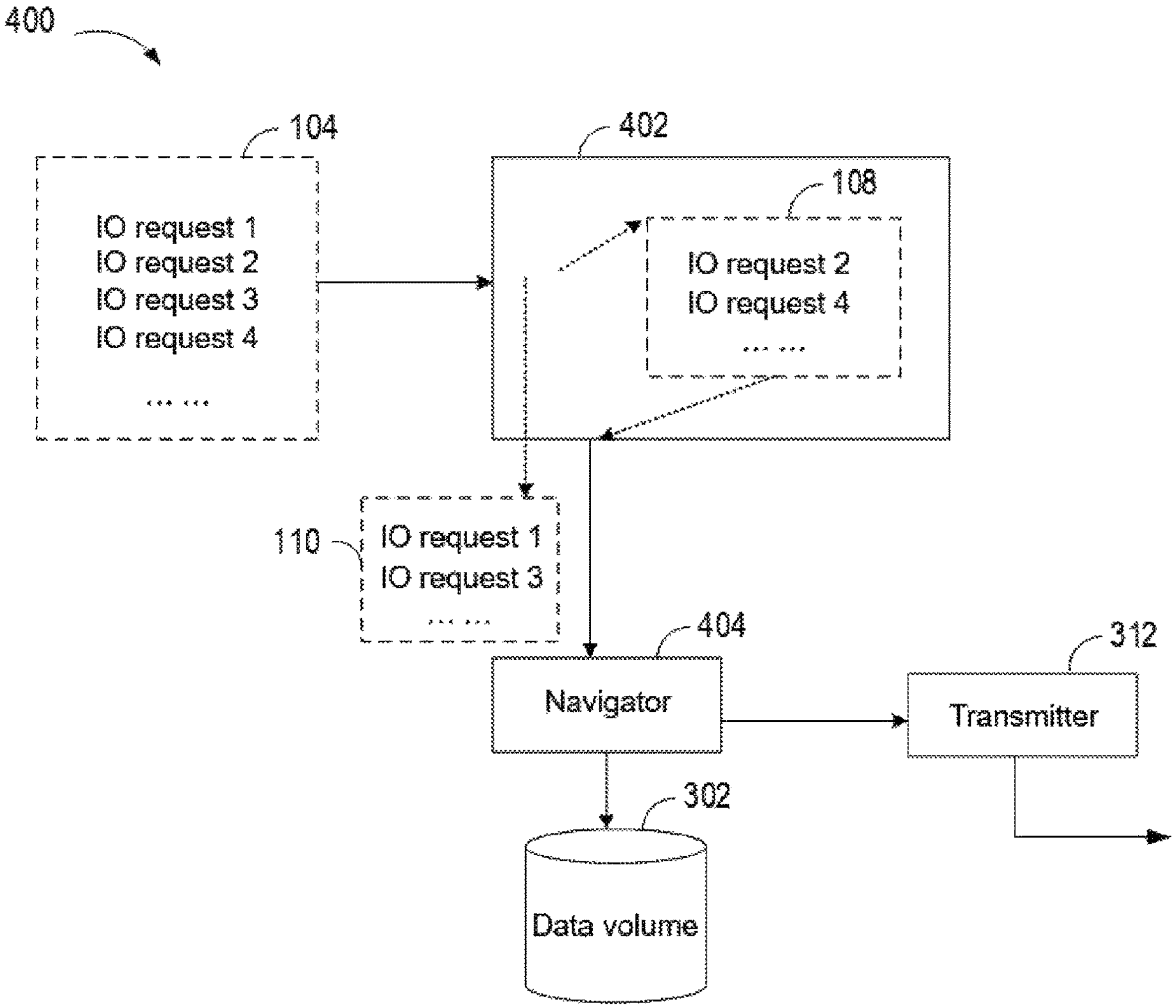
FIG. 4 shows a schematic diagram of IO request processing for synchronous replication according to some embodiments of the present disclosure.

FIG. 4 shows a schematic diagram of a process 400 of IO request processing for synchronous replication according to some embodiments of the present disclosure. In FIG. 4, the layered service 402 receives sequential IO requests 104 from a host. Generally, a storage array will always inform the host of its optimal transmission length, which is consistent with its internal page size, so that better performance will be achieved when the host transmits data in a page size that is consistent with the storage array. However, when a page size of a target terminal is larger than a page size of a source terminal, in an embodiment of the present disclosure, an optimal transmission length of a data volume of the source terminal will be updated to the page size of the target terminal, and after the replication is completed, the optimal transmission length of the data volume of the source terminal will be restored to the page size of the source terminal.

Similar to some of the operations done by the replicator 308 in the asynchronous replication, when a target remote system has a larger page size than that of a local system, an optimal transmission length of the data volume 302 is updated to the page size of the target terminal; after the layered service 402 transmits an IO request to a navigator 404, an IO end offset is updated with a sum of an offset of the IO request and a constant length; and the offset of the IO request is compared with the updated IO end offset to determine whether the IO request shares the same page with the last transmitted IO request. For example, after the layered service 402 transmits an IO request 1 to the navigator 404, the IO end offset is updated with a sum of an offset of the IO request 1 and the constant length, and an offset of an IO request 2 is compared with the updated IO end offset to determine whether the IO request 2 shares the same page with the IO request 1.

If an offset of the next IO request and the updated IO end offset satisfy equation (1), it can be determined that the next IO request will share the same page with the last transmitted IO request, so that the next IO request is placed in the IO request waiting queue 108 to wait for transmission. Otherwise, the next IO request is transmitted to the navigator 404, and the IO end offset is updated with a sum of an offset of the next IO request and the constant length to compare with the offset of the next IO request. For example, if the offset of the IO request 2 and the updated IO end offset satisfy equation (1), it can be determined that the IO request 2 will share the same page with the IO request 1, so that the IO request 2 is placed in the IO request waiting queue 108. Otherwise, the IO request 2 is transmitted to the navigator 404, and the IO end offset is updated with the sum of the offset of the IO request 2 and the constant length.

In some embodiments, the navigator 404 serves as another layered service for mirroring a host IO, is located below the layered service 402, and is therefore transparent to IO reordering, so that an IO request arriving at the navigator 402 can be directly transmitted to the data volume 302 without additional processing. Further, since the IO request transmitted from the host is transmitted according to the optimal transmission length of the target terminal, the IO request arriving at the navigator 402 can also be directly transmitted to the transmitter, so as to be transmitted to the target terminal (target site) without additional processing. Additionally, at the target terminal (target site), for a replicated IO from a peer system, its layered service will not perform reordering.

For IO requests in the IO request waiting queue 108, in order to enable them to be transmitted without increasing latency, the two mechanisms used in the above asynchronous replication are used as well, which will not be repeated here (referring to FIG. 3A to FIG. 3B and descriptions thereof).

Through the method mentioned above, no matter whether it is for the synchronous replication, the asynchronous replication, or other replication types, the IO reordering method can avoid the IO performance degradation caused by the page size of the source terminal being smaller than the page size of the target terminal. The improvements in IO latency using the method described herein will be shown through some test results below.

Table 1 shows test results on a system with a page size of 4 KB for reference. In an embodiment of the present disclosure, offsets of partial inputs are set to 2 KB, it can be found that the average IO latency increases significantly, while the transmission speed decreases to below 1/10, where IOPS represents input/output operations per second.

TABLE 1

List of misaligned IO replication test results

| FIO type | Offset | Constant length | IO depth | IOPS | Average IO latency |
|---|---|---|---|---|---|
| Sequential inputs | 0 KB | 64 KB | 32 | 16.1k | 0.30 ms |
| Sequential inputs | 2 KB | 64 KB | 32 | 1402 | 22.86 ms |

Further, as shown in Table 2, on the system with the page size of 4 KB, in an embodiment of the present disclosure, a metro volume of a misaligned host IO is also tested, and there are more latency increases because a page is shared between two sites.

TABLE 2

List of misaligned host IO replication test results

| FIO type | Offset | Constant length | IO depth | IOPS | Average IO latency |
|---|---|---|---|---|---|
| Sequential inputs | 0 KB | 64 KB | 32 | 10.4k | 0.99 ms |
| Sequential inputs | 2 KB | 64 KB | 32 | 594 | 54 ms |

However, after the method described herein is used, the system with the page size of 4 KB is still used, and the offset is set to 2 KB for testing. The test results are as shown in Table 3 and FIG. 5. During the testing, in an embodiment of the present disclosure, a queue length is adjusted to achieve better performance, and the results show that a queue length greater than 3 has little impact. According to the results in Table 3, misaligned sequential IO latency is reduced from previous 22.86 milliseconds to about 1.6 milliseconds, indicating that the method of the present disclosure reduces the sharing of a cached page among misaligned IO requests in the queue, thereby improving the overall IO performance.

TABLE 3

List of misaligned IO replication test results after using the method of the present disclosure

| FIO type | Offset | Constant length | IO depth | IOPS | Average IO latency | Dequeue, when length is longer than ? or time is longer than ? |
|---|---|---|---|---|---|---|
| Sequential inputs | 0 KB | 64 KB | 32 | 15.8 k | 0.31 ms | N/A |
| Sequential inputs | 2 KB | 64 KB | 32 | 7695 | 3.0 ms | Length > 1, time > 0 |
| Sequential inputs | 2 KB | 64 KB | 32 | 12.8 k | 1.84 ms | Length > 3, time > 50 ns |
| Sequential inputs | 2 KB | 64 KB | 32 | 13.9 k | 1.6 ms | Length > 4, time > 100 ns |
| Sequential inputs | 2 KB | 64 KB | 32 | 13.6 k | 1.76 ms | Length > 6, time > 200 ns |

Figure 5:
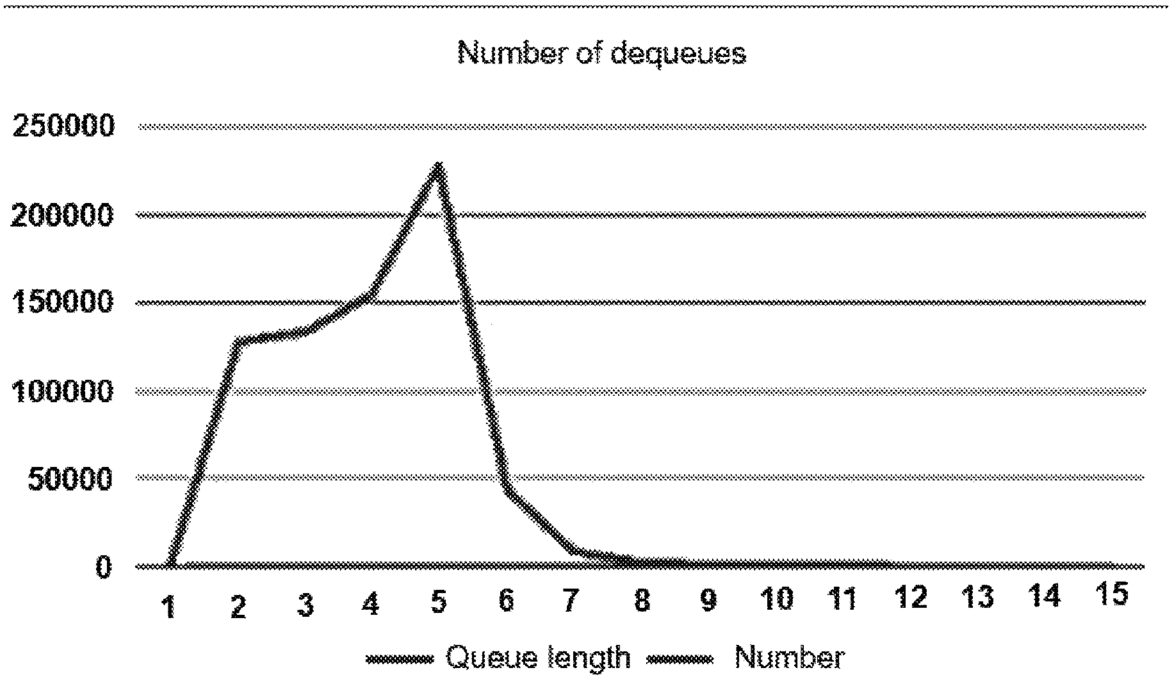
FIG. 5 shows a schematic diagram of variation of the number of dequeues with respect to a queue length according to some embodiments of the present disclosure.

In addition, FIG. 5 shows a schematic diagram of variation of the number of dequeues with respect to a queue length according to some embodiments of the present disclosure. The longitudinal axis represents the number of dequeues, and the horizontal axis represents the queue length. As can be seen from the results in Table 3 and FIG. 5, the optimal setting is to perform dequeuing when the length is longer than 4 or the time elapse is longer than 100 ns. In an embodiment of the present disclosure, it is found from a log that when the dequeuing is requested, the queue length is almost shorter than 6. Therefore, in general, the queue length will be very short, which means limited memory consumption.

In addition, in an embodiment of the present disclosure, a metro volume of a misaligned host IO is also tested, and it is found that the host IO latency is also greatly improved compared with the previous value, as shown in Table 4.

TABLE 4

List of misaligned host IO replication test results after using the method of the present disclosure

| FIO type | Offset | Constant length | IO depth | IOPS | Average IO latency |
|---|---|---|---|---|---|
| Sequential inputs | 0 KB | 64 KB | 32 | 10.8k | 1.68 ms |
| Sequential inputs | 2 KB | 64 KB | 32 | 6915 | 4.1 ms |

Figure 6:
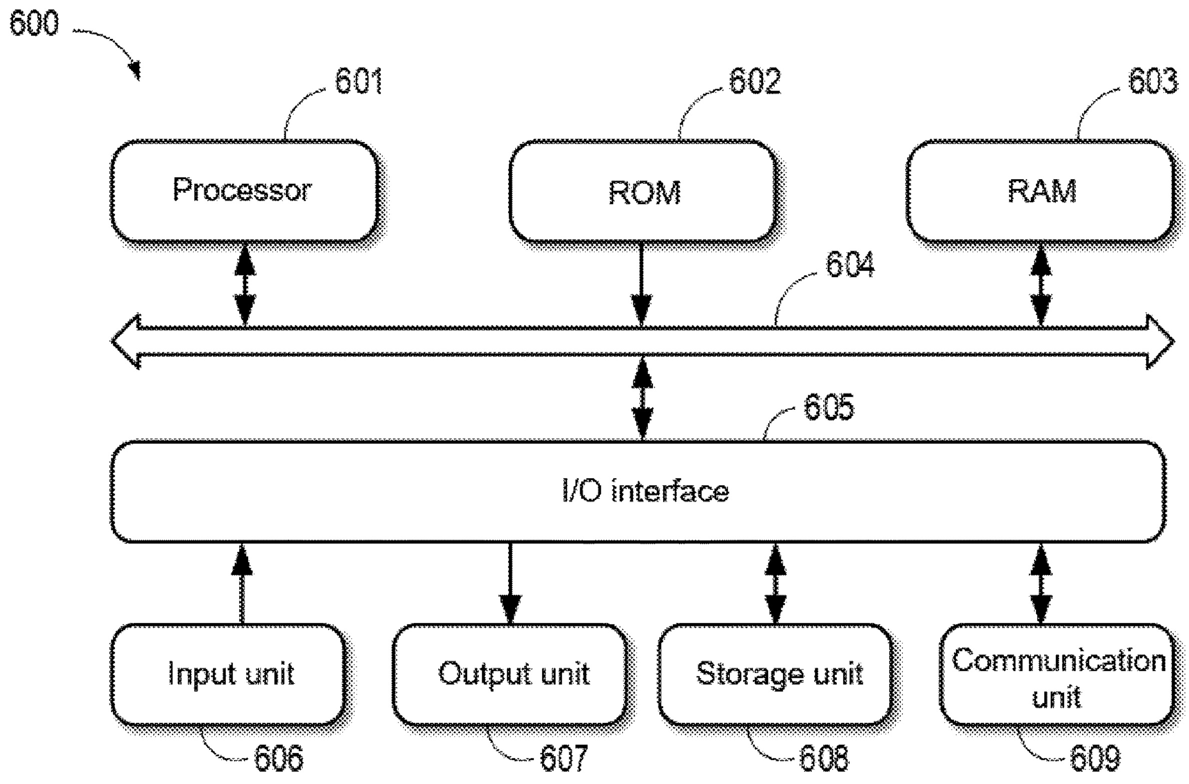
FIG. 6 shows a schematic block diagram of an example device suitable for implementing embodiments of the present disclosure.

FIG. 6 shows a schematic block diagram of an example device 600 that can be configured to implement embodiments of the present disclosure. As shown in the figure, the device 600 includes a processor 601, which may execute various appropriate actions and processes in accordance with computer program instructions stored in a read-only memory (ROM) 602 or computer program instructions loaded into a random-access memory (RAM) 603 from a storage unit 608. The RAM 603 may further store various programs and data required by operations of the device 600. The processor 601, the ROM 602, and the RAM 603 are connected to each other through a bus 604. An input/output (I/O) interface 605 is also connected to the bus 604.

A number of components in the device 600 are connected to the I/O interface 605, including: an input unit 606, such as a keyboard or a mouse; an output unit 606, such as various types of displays or speakers; the storage unit 608, such as a magnetic disk or an optical disk; a communication unit 609, such as a network card, a modem, or a wireless communication transceiver. The communication unit 609 allows the device 600 to exchange information/data with other devices via a computer network such as the Internet and/or various telecommunication networks.

The processor 601 may be various general-purpose and/or special-purpose processing components having a processing power and a computing power. Some examples of the processor 601 include, but are not limited to, a central processing unit (CPU), a graphics processing unit (GPU), various special-purpose artificial intelligence (AI) computing chips, various processors running a machine learning model algorithm, a digital signal processor (DSP), and any appropriate processor, controller, micro-controller, and the like. The processor 601 executes various methods and processing described above, such as the method 200. For example, in some embodiments, the method 200 may be implemented as a computer software program that is tangibly included in a machine-readable medium such as the storage unit 608. In some embodiments, part or all of the computer program may be loaded and/or installed onto the device 600 via the ROM 602 and/or the communication unit 609. When the computer program is loaded into the RAM 603 and executed by the processor 601, one or more steps of the method 200 described above may be executed. Alternatively, in other embodiments, the processor 601 may be configured to execute the method 200 by any other appropriate approach (e.g., by means of firmware).

The functions described above herein may at least partially be executed by one or more hardware logic components. For example, non-restrictively, example types of usable hardware logic components include: a field programmable gate array (FPGA), an application specific integrated circuit (ASIC), an application specific standard product (ASSP), a system-on-chip system (SOC), a loading programmable logic device (CPLD), and so on.

Program codes for implementing the method of the present disclosure may be compiled using any combination of one or more programming languages. The program codes may be provided to a processor or controller of a general-purpose computer, a special-purpose computer, or other programmable data processing apparatuses, such that the program codes, when executed by the processor or controller, cause the functions/operations specified in the flow charts and/or block diagrams to be implemented. The program codes may be completely executed on a machine, partially executed on a machine, partially executed as a separate software package on a machine and partially executed on a remote machine, or completely executed on a remote machine or server.

In the context of the present disclosure, the machine-readable medium may be a tangible medium which may contain or store a program for use by, or use in combination with, an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of the above. Further, while the operations are depicted in a particular order, it should be understood that the operations are required to be executed in the shown particular order or in a sequential order, or that all illustrated operations are required to be executed to achieve desired results. In a certain environment, multitasking and parallel processing may be advantageous. Similarly, while a number of specific implementation details are included in the above description, these implementation details should not be construed as limiting the scope of the present disclosure. Some features described in the context of separate embodiments may also be implemented in combination in a single implementation. On the contrary, various features described in the context of a single implementation may also be implemented in a plurality of implementations separately or in any appropriate subcombination.

While the present subject matter has been described in a language specific to structural features and/or logical actions of the method, it should be understood that the subject matter defined in the appended claims is not necessarily limited to the particular features or actions described above. On the contrary, the particular features and actions described above are merely example forms of implementation of the claims.

The invention claimed is:

1. A method for processing an input/output (IO) request, comprising:

transmitting a first IO request from a source terminal to a target terminal;

determining whether a second IO request shares the same page of the target terminal with the first IO request based on a first page size of the source terminal and a second page size of the target terminal, the second IO request being after the first IO request;

placing, in response to the second IO request sharing the same page of the target terminal with the first IO request, the second IO request in a queue for queuing up to wait for transmission; and performing a transmitting action that includes:

(A) checking, in response to a callback of the first IO request, whether there are more than a threshold number of IO requests in the queue, and transmitting, in response to that there are more than the threshold number of said IO requests in the queue, the IO requests in the queue to the target terminal;

(B) checking, in response to a callback of the first IO request, whether the queue has experienced a wait time exceeding a threshold time since the last IO request was transmitted; and transmitting, in response to that the queue has experienced the wait time exceeding the threshold time since the last IO request was transmitted, the IO request in the queue to the target terminal; or (C) creating a thread for regularly checking an IO request in the queue; and transmitting, in response to checking that there is an IO request in the queue through the thread, the IO request to the target terminal.

2. The method according to claim 1, wherein performing the transmitting action includes:

checking, in response to a callback of the first IO request, whether there are more than a threshold number of IO requests in the queue; and transmitting, in response to that there are more than the threshold number of said IO requests in the queue, the IO requests in the queue to the target terminal.

3. The method according to claim 1, wherein performing the transmitting action includes:

checking, in response to a callback of the first IO request, whether the queue has experienced a wait time exceeding a threshold time since the last IO request was transmitted; and transmitting, in response to that the queue has experienced the wait time exceeding the threshold time since the last IO request was transmitted, the IO request in the queue to the target terminal.

4. The method according to claim 1, wherein performing the transmitting action includes:

creating a thread for regularly checking an IO request in the queue; and transmitting, in response to checking that there is an IO request in the queue through the thread, the IO request to the target terminal.

5. The method according to claim 1, wherein the method further comprises:

setting two attributes for a data volume, wherein the two attributes comprise:

an optimal transmission length whose value is initialized to a page size of a terminal where the data volume is located; and an IO end offset whose value is initialized to zero.

6. The method according to claim 5, wherein the method further comprises:

updating, in response to the replication from the source terminal to the target terminal being synchronous replication, the optimal transmission length of the data volume of the source terminal to the page size of the target terminal; and restoring, in response to the completion of the replication, the optimal transmission length of the data volume of the source terminal to the page size of the source terminal.

7. The method according to claim 5, wherein the method further comprises:

setting two attributes in a replicator in response to the replication from the source terminal to the target terminal being asynchronous replication, wherein the two attributes comprise:

a reordering indication indicating whether to reorder the IO requests; and the IO end offset whose value is initialized to zero.

8. The method according to claim 7, wherein the method further comprises:

recording the IO end offset in the replicator, and updating a value of the IO end offset based on an IO offset of the first IO request and a length of the first IO request.

9. The method according to claim 8, wherein determining whether the second IO request shares the same page of the target terminal with the first IO request comprises:

determining whether the second IO request shares the same page of the target terminal with the first IO request based on an offset of the second IO request, the IO end offset of the first IO request, and the page size of the target terminal.

10. The method according to claim 1, wherein the method further comprises:

transmitting the second IO request to the target terminal in response to the second IO request not sharing the same page of the target terminal with the first IO request.

11. An electronic device, comprising:

at least one processor; and a memory coupled to the at least one processor and having instructions stored thereon, wherein the instructions, when executed by the at least one processor, cause the electronic device to execute actions comprising:

transmitting a first IO request from a source terminal to a target terminal;

determining whether a second IO request shares the same page of the target terminal with the first IO request based on a first page size of the source terminal and a second page size of the target terminal, the second IO request being after the first IO request;

placing, in response to the second IO request sharing the same page of the target terminal with the first IO request, the second IO request in a queue for queuing up to wait for transmission; and performing a transmitting action that includes:

(A) checking, in response to a callback of the first IO request, whether there are more than a threshold number of IO requests in the queue, and transmitting, in response to that there are more than the threshold number of said IO requests in the queue, the IO requests in the queue to the target terminal;

(B) checking, in response to a callback of the first IO request, whether the queue has experienced a wait time exceeding a threshold time since the last IO request was transmitted; and transmitting, in response to that the queue has experienced the wait time exceeding the threshold time since the last IO request was transmitted, the IO request in the queue to the target terminal; or (C) creating a thread for regularly checking an IO request in the queue; and transmitting, in response to checking that there is an IO request in the queue through the thread, the IO request to the target terminal.

12. The device according to claim 11, wherein performing the transmitting action includes:

checking, in response to a callback of the first IO request, whether there are more than a threshold number of IO requests in the queue; and transmitting, in response to that there are more than the threshold number of said IO requests in the queue, the IO requests in the queue to the target terminal.

13. The device according to claim 11, wherein performing the transmitting action includes:

checking, in response to a callback of the first IO request, whether the queue has experienced a wait time exceeding a threshold time since the last IO request was transmitted; and transmitting, in response to that the queue has experienced the wait time exceeding the threshold time since the last IO request was transmitted, the IO request in the queue to the target terminal.

14. The device according to claim 11, wherein performing the transmitting action includes:

creating a thread for regularly checking an IO request in the queue; and transmitting, in response to checking that there is an IO request in the queue through the thread, the IO request to the target terminal.

15. The device according to claim 11, wherein the actions further comprise:

setting two attributes for a data volume, wherein the two attributes comprise:

an optimal transmission length whose value is initialized to a page size of a terminal where the data volume is located; and an IO end offset whose value is initialized to zero.

16. The device according to claim 15, wherein the actions further comprise:

updating, in response to the replication from the source terminal to the target terminal being synchronous replication, the optimal transmission length of the data volume of the source terminal to the page size of the target terminal; and restoring, in response to the completion of the replication, the optimal transmission length of the data volume of the source terminal to the page size of the source terminal.

17. The device according to claim 15, wherein the actions further comprise:

setting two attributes in a replicator in response to the replication from the source terminal to the target terminal being asynchronous replication, wherein the two attributes comprise:

a reordering indication indicating whether to reorder the IO requests; and the IO end offset whose value is initialized to zero.

18. The device according to claim 17, wherein the actions further comprise:

recording the IO end offset in the replicator, and updating a value of the IO end offset based on an IO offset of the first IO request and a length of the first IO request.

19. The device according to claim 18, wherein determining whether the second IO request shares the same page of the target terminal with the first IO request comprises:

determining whether the second IO request shares the same page of the target terminal with the first IO request based on an offset of the second IO request, the IO end offset of the first IO request, and the page size of the target terminal.

20. A computer program product having a non-transitory computer readable medium which stores a set of instructions to process an input/output (IO) request; the set of instructions, when carried out by computerized circuitry, causing the computerized circuitry to perform a method of:

transmitting a first IO request from a source terminal to a target terminal;

determining whether a second IO request shares the same page of the target terminal with the first IO request based on a first page size of the source terminal and a second page size of the target terminal, the second IO request being after the first IO request;

placing, in response to the second IO request sharing the same page of the target terminal with the first IO request, the second IO request in a queue for queuing up to wait for transmission; and performing a transmitting action that includes:

(A) checking, in response to a callback of the first IO request, whether there are more than a threshold number of IO requests in the queue, and transmitting, in response to that there are more than the threshold number of said IO requests in the queue, the IO requests in the queue to the target terminal;

(B) checking, in response to a callback of the first IO request, whether the queue has experienced a wait time exceeding a threshold time since the last IO request was transmitted; and transmitting, in response to that the queue has experienced the wait time exceeding the threshold time since the last IO request was transmitted, the IO request in the queue to the target terminal; or (C) creating a thread for regularly checking an IO request in the queue; and transmitting, in response to checking that there is an IO request in the queue through the thread, the IO request to the target terminal.

* * * * *